United States Patent [19]
Ino et al.

[11] Patent Number: 4,652,752
[45] Date of Patent: Mar. 24, 1987

[54] VACUUM GAUGE

[75] Inventors: Yoichi Ino; Kazuo Kosuge, both of Fuchu, Japan

[73] Assignee: Anelva Corporation, Tokyo, Japan

[21] Appl. No.: 801,446

[22] Filed: Nov. 25, 1985

[30] Foreign Application Priority Data

Nov. 27, 1984 [JP] Japan .............................. 59-250288

[51] Int. Cl.⁴ .............................................. B01D 59/44
[52] U.S. Cl. .................................. 250/281; 250/288; 73/753; 324/460; 364/558
[58] Field of Search ............... 250/281, 282, 288, 289; 73/1 G, 40.7, 753; 324/460; 364/558

[56] References Cited

U.S. PATENT DOCUMENTS

| | | | |
|---|---|---|---|
| 3,866,041 | 2/1975 | Attia | 250/281 |
| 3,881,093 | 4/1975 | Andre et al. | 364/558 |
| 4,314,205 | 2/1982 | Paitich et al. | 324/460 |
| 4,442,353 | 4/1984 | Baubron | 250/281 |
| 4,492,110 | 1/1985 | Bergquist | 250/288 |

Primary Examiner—Bruce C. Anderson
Attorney, Agent, or Firm—Pollock, VandeSande & Priddy

[57] ABSTRACT

A vacuum gauge includes a quadrupole mass spectrometer for measuring an ion current value of respective gas components, the Bayard-Alpart type ionization gauge for measuring an apparent total pressure value of the gas components, an arithmetic logic unit for calculating a predetermined equation so as to obtain concentration of the respective gas components and also measurement sensitivity of the respective gas components, whereby the apparent total pressure value is corrected, based upon the measurement sensitivity of the respective gas components, to derive a real total pressure value of the measured gas components.

9 Claims, 3 Drawing Figures

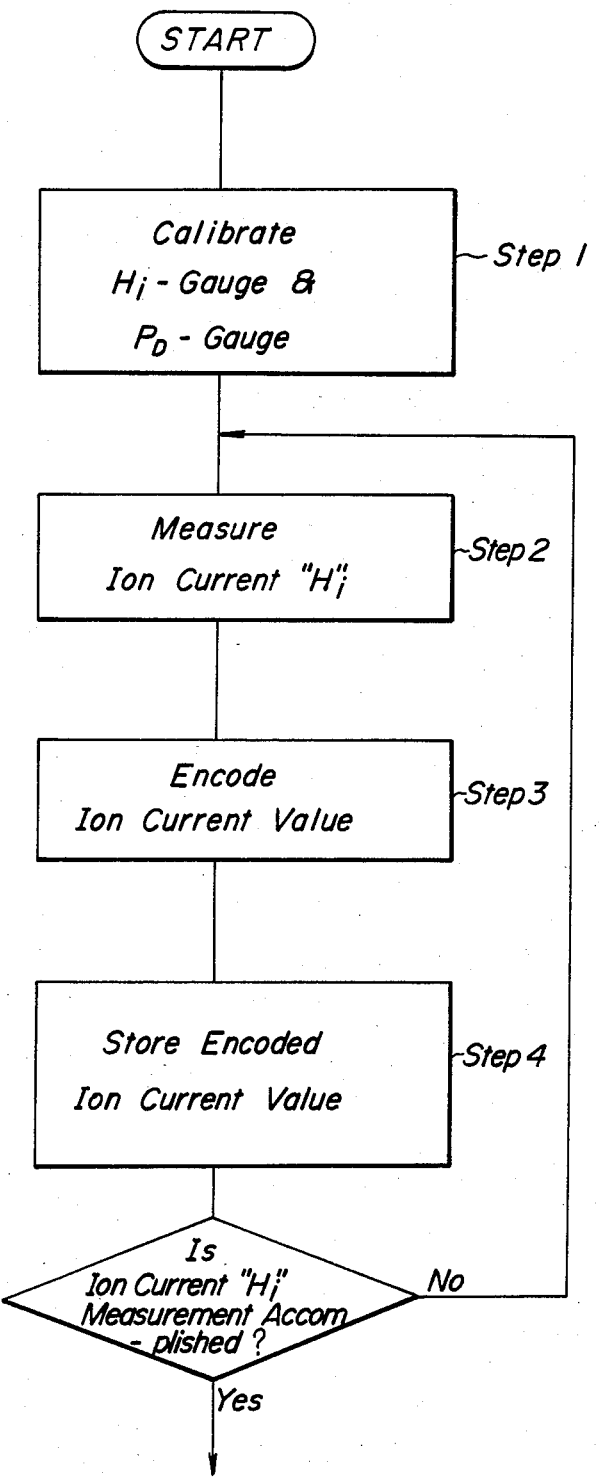

VACUUM GAUGE

BACKGROUND OF THE INVENTION

1. Field of the Invention

The present invention relates to a vacuum gauge for measuring total pressure (vacuum pressure) and/or partial pressure of gas components in use of various types of vacuum pressure measuring apparatus.

2. Description of the Prior Art

In the conventional vacuum gauges, total pressure measurement is effected by the total pressure gauge and partial pressure measurement is performed by the partial pressure gauge that is completely independently performed from the former measurement. In other words, no correlation exists in both the pressure measurement.

As such a conventional total pressure gauge, the Bayard Alpart type ionization gauge and the Penning gauge are known, while the magnetic sector mass spectrometer and the quadrupole mass spectrometer are used as the conventional partial pressure gauge.

As is well known in this field, the above-described total pressure gauges provide advantages of simple construction as well as stable measurement.

However, they represent different sensitivity depending upon various types of gas species, resulting in poor reliability on the measured pressure values. Accordingly, the real total pressure value cannot be measured unless the total pressure measurement is performed by employing corrections based on the types of the gas species to be measured.

Although the conventional partial pressure gauges such as mass spectrometer are in complex arrangements and also represent fluctuations in the measurement of various types of gas species, but it features to provide extremely stable conditions with respect to the ion current ratio of the gas components.

In accordance with the conventional pressure measurement, the total pressure and the partial pressure are independently measured by the total pressure gauge and the mass spectrometer, respectively. As a result, reliable values may not be obtained in both the total and partial pressure measurement since the above-described inherent errors are contained therein.

An object of the present invention is to provide a vacuum gauge for stably and precisely measuring the total pressure of vacuum and/or the partial pressure of gas components.

SUMMARY OF THE INVENTION

The above-described drawbacks may be overcome and the object and other features may be obtained by providing a mass spectrometer for measuring an ionization current value of respective gas components;

a total pressure gauge for measuring an apparent total pressure value of the gas components;

a calculation unit for calculating a predetermined equation so as to obtain concentration of the respective gas components and also measurement sensitivity of the respective gas components, whereby the apparent total pressure value is corrected, based upon the measurement sensitivity of the respective gas components, to derive a real total pressure value of the measured gas components.

BRIEF DESCRIPTION OF THE DRAWINGS

For a better understanding of the above and other objects of the invention, reference is made to the following detailed description of the invention to be read in conjunction with the following drawings, in which:

FIGS. 2A and 2B show a flow chart useful in explaining typical calculation/measurement by the vacuum gauge of FIG. 1.

DETAILED DESCRIPTION OF THE PREFERRED EMBODIMENTS

Figure 1:
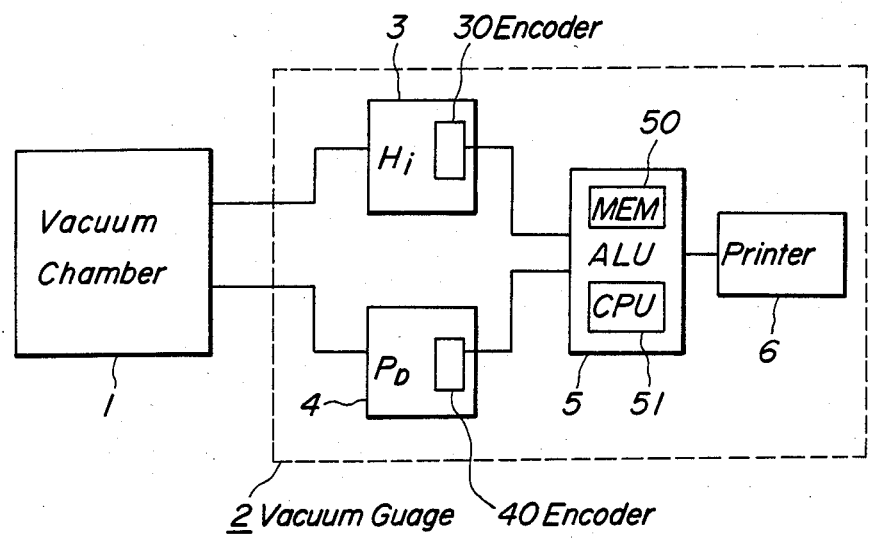
FIG. 1 is a schematic block diagram of a vacuum gauge according to one preferred embodiment of the invention.

Before proceeding with various types of preferred embodiments, the principle idea will now be described by which the present invention can be realized.

In case that gas components having their M/Z numbers of 1, 2, ---, ---, m and n are involved a vacuum, the following simple equation of many unknowns can be given to the relationship among the respective ion currents $H_1$, $H_2$, ---, $H_i$, --- $H_m$ and $H_n$, a ratio of the sensitivity to the respective gas components $S_1$, $S_2$, --- $S_m$ and $S_n$ (as is known, it is represented by a relative ratio of the sensitivity to the nitrogen ($N_2$) gas), and partial pressure current for the above gas components $R_1$, $R_2$, ---, $R_m$ and $R_n$ (correctly speaking, the value obtained by multiplying the respective partial pressures by the $N_2$ sensitivity):

$$\left.\begin{array}{l} H_1 = a_{11}S_1R_1 + a_{12}S_2R_2 + \ldots a_{1n}S_nR_n \\ H_2 = a_{21}S_1R_1 + a_{22}S_2R_2 + \ldots a_{2n}S_nR_n \\ \ldots \\ H_m = a_{m1}S_1R_1 + a_{m2}S_2R_2 + \ldots a_{mn}S_nR_n \\ H_n = a_{n1}S_1R_1 + a_{n2}S_2R_2 + \ldots a_{nn}S_nR_n \end{array}\right\} \quad (1)$$

Where the matrix consisting of the coefficients $a_{11}$, $a_{12}$, --- $a_{ij}$, ---, $a_{in}$ in the right side is known as the cracking pattern and simultaneously, the values of the respective coefficient elements "$a_{ij}$" are known.

If the ion currents $H_1$, $H_2$, ---, $H_n$ are measured by the mass spectrometer and the measurement results are introduced into the equation (1), this simple equation can be solved with respect to the partial pressure currents $R_1$, $R_2$, ---, $R_i$, ---, $R_n$.

When the partial pressure currents "$R_i$" are calculated, the concentration of the respective gas components "$C_i$" can be obtained from the following equation:

$$C_i = R_i/(R_1 + R_2 + \ldots R_n) = R_i/\Sigma R_i \quad ---(2)$$

As previously described, the partial pressure current "$R_i$" calculated by use of the equation (1) is equal to a certain amount proportional to the partial pressure value, but does not directly represent an absolute value of the partial pressure. To the contrary, the coefficient "$C_i$" calculated by use of the equation (2) is equal to a value substantially same as an absolute value thereof (i.e., a value from which the inherent errors involved in the measurement system have been eliminated), because the proportional constants of both the denominator and the numerator have been cancelled.

In the mass spectrometer, the relative values of the ion currents $H_1$, $H_2$, ---, $H_n$ are sufficiently stable in their accuracy, so that the concentration "$C_i$" calculated by use of the equation (2) is reliable to a great extent in its accuracy.

Since the concentration of the gas components "$C_i$" can be precisely calculated by employing the above equations, the sensitivity "A" of the total pressure gauge (i.e., the relative sensitivity to the nitrogen gas) can be obtained with higher accuracy by the following equation;

$$A = C_1A_1 + C_2A_2 + \ldots C_nA_n = \Sigma C_i A_i \quad \text{---(3)}$$

where i is selected from 1, 2, ..., m, n

It is noted that the coefficient element "$A_i$" is the sensitivity of the gas components (i.e., the relative sensitivity to the nitrogen gas), and is per se known.

Accordingly, the desired real pressure value "$P_T$" can be calculated by a given equation (4), because the apparent pressure value "$P_D$" indicated by the total pressure gauge can be corrected;

$$P_T = P_D/A \quad \text{--- (4)}$$

Once the real pressure value "$P_T$" is attained from above equation (4), it is very easy to calculate the partial pressure values of the gas components. That is, assuming that the respective partial pressure values are referred to as $P_1, P_2, \ldots, P_i, \ldots P_m$ and $P_n$, the partial pressure values "$P_i$" are given by the below-mentioned equation;

$$P_i = C_i P_T \quad \text{--- (5)}$$

As has been described in detail, the precise total pressure values and/or the partial pressure values can be easily calculated according to the invention by processing the measurement results of both the mass spectrometer and the total pressure gauge with compensating for the inherent errors, i.e., in accuracy.

Referring now to a block diagram of FIG. 1 and a flow chart shown in FIGS. 2A, 2B, a vacuum gauge according to one preferred embodiment of the invention will be described.

Figure 2B:
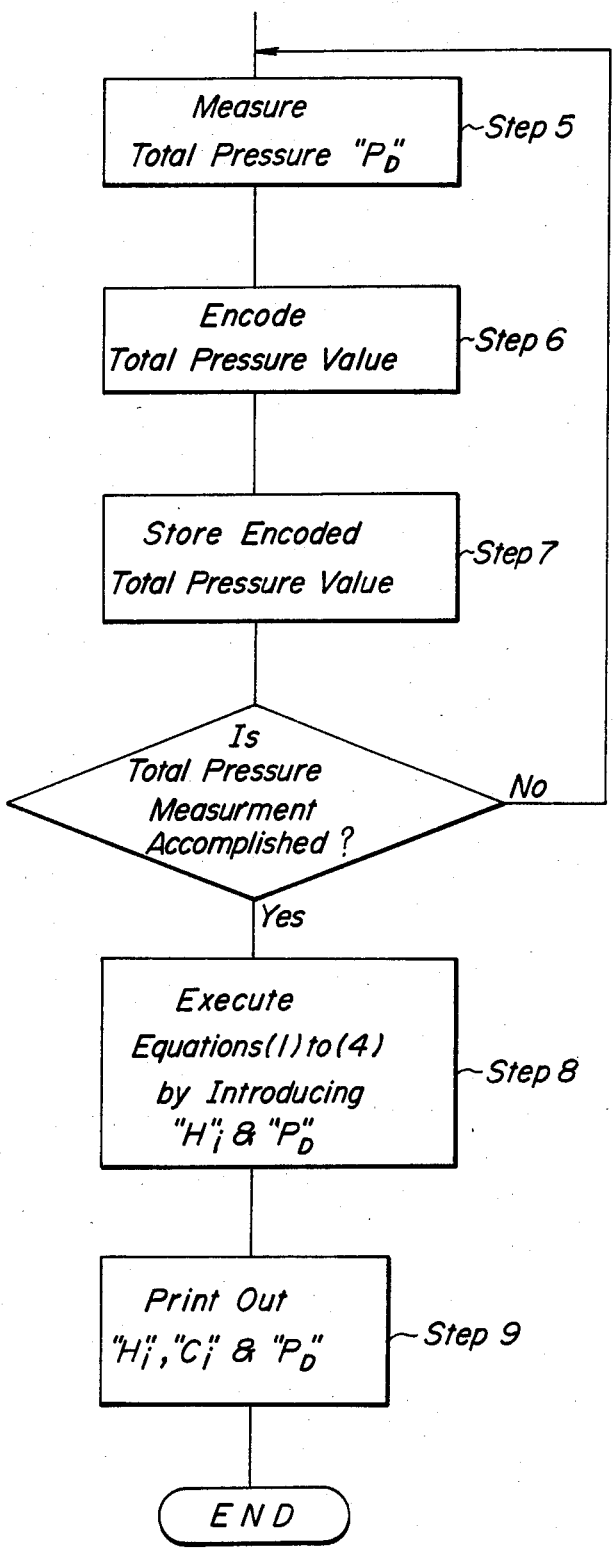

In FIG. 1, a vacuum chamber 1 to be measured is mechanically and tightly connected to the vacuum gauge 2 according to the present invention. The calibration is performed to the quadrupole mass spectrometer 3 and the Bayard-Alpart type ionization gauge 4 (in step 1).

The vacuum gauge 2 is mainly constructed of the quadrupole mass spectrometer 3, the Bayard-Alpart type ionization gauge 4, an arithmetic logic circuit (ALU) 5 and a printer 6. The quadrupole mass spectrometer 3 includes an encoder 30. The quadrupole mass spectrometer 3 measures the ion currents $H_1, H_2, \ldots, H_n$ of the gas components contained in the gas of the vacuum chamber 1 (in step 2). The encoder 30 encodes the ion currents into encoded data thereof (in step 3). Thus the encoded data of the ion currents in a digital form is delivered to the arithmetic logic unit 5 to be stored in a memory (in step 4).

The Bayard-Alpart type ionization gauge 4 measures the total pressure value "$P_D$" (in step 5). This gauge 4 also includes an encoder 40 for encoding the total pressure value "$P_D$" into encoded data thereof (in step 6). The encoded total pressure value "$P_D$" is also delivered to the arithmetic logic unit 5 so as to be stored in the memory (in step 7). As previously described, this total pressure value "$P_D$" involves inherent errors, thereby being sometimes referred to as "an apparent total pressure value".

The arithmetic logic unit 5 includes a memory 50 and a central processing unite 51. The memory 50 stores not only the above-described ion current values "$H_i$" and total pressure values "$P_D$", but also the following items. That is, values of sensitivity $S_1, S_2, \ldots S_n$ of the quadrupole mass spectrometer 3 with respect to the gas having the M/Z number, the respective coefficient elements "$a_{ij}$" of the cracking pattern matrix, and a system program for executing the above-described equations (1) to (4) are stored.

The central processing unite 51 processes the above equations (1) through (4) in turn by reading out the encoded ion currents $H_1, H_2, \ldots, H_n$ and the encoded total pressure value "$P_D$" (in step 8). The resultant data of the ion current "$H_i$", gas concentration "$C_i$" and total pressure "$P_D$" can be derived from the central processing unit 51 and then printed out on the printer 6 (in step 9).

The following data was obtained by the experiment under the condition that helium (He), carbon monoxide (CO) and nitrogen ($N_2$) gases are remained in the vacuum chamber 1. The vacuum gauge 2 according to the invention measured the total pressure and the partial pressure for the remained gases, of which data was printed out by the printer 6 together with the necessary data such as input values.

The ion currents of the quadrupole mass spectrometer 3 were:

$$H_1(He \text{ gas}, M/Z=4) = 1 \times 10^{-8} A$$

$$H_2(N_2 \text{ gas}, M/Z=14) = 5 \times 10^{-9} A$$

$$H_3(N_2 + CO \text{ gas}, M/Z=28) = 1 - 10^{-7} A$$

The apparent total pressure measured by the Bayard-Alpart type ionization gauge 4 were:

$$P_D = 1 \times 10^{-7} \text{ Torr}$$

The concentration of the respective gases was:

$$C_1 = 0.339, C_2 = 0.176, C_3 = 0.485$$

After a predetermined calculation of equations was effected, the real total pressure was attained:

$$P_T = 1.34 \times 10^{-7} \text{ Torr}$$

The partial pressures were calculated:

$$P_1(He) = 4.54 \times 10^{-8} \text{ Torr}$$

$$P_2(CO) = 2.36 \times 10^{-8} \text{ Torr}$$

$$P_3(N_2) = 6.50 \times 10^{-8} \text{ Torr}$$

During the above calculation, the respective coefficient elements of equation (1) were as follows.

$$1 \times 10^{-8} = 1.0 \times 0.2 \times R_1$$

$$5 \times 10^{-9} = 0.07 \times 1.0 \times R_3$$

$$1 \times 10^{-7} = 1.0 \times 1.1 \times R_2 + 1.0 \times 1.0 \times R_3$$

Since the resultant data was printed immediately after the completion of the measurement of the ion current "$H_i$" and the total pressure "$P_D$", this causes greatly advantages in the measurement by the vacuum gauge 2 in a case that many sorts of the gas components, e.g., more than 10 sorts of the gas mixture are contained in the vacuum chamber 1.

As previously described in detail, the total pressure of vacuum and/or the partial pressure of the gas components can be precisely and stably measured by the vacuum gauge according to the invention.

While the invention has been described in terms of certain preferred embodiments, and exemplified with respect thereto, those skilled in the art will reading appreciate that various modifications, changes, omissions, and substitutions may be made without departing from the spirit of the invention.

For instance, it is possible to employ other combinations of the mass spectrometer the total pressure gauge and the arithmetic logic unit. Furthermore, the resultant data may be displayed on a TV monitor, or temporarily stored in a stage unit.

What is claimed is:

1. A vacuum gauge comprising:
    a mass spectrometer for measuring an ion current value of respective gas components;
    a total pressure gauge for measuring an apparent total pressure value of the gas components;
    a calculation unit for calculating a predetermined equation so as to obtain concentration of the respective gas components and also measurement sensitivity of the respective gas components, whereby the apparent total pressure value is corrected, based upon the measurement sensitivity of the respective gas components, to derive a real total pressure value of the measured gas components.

2. A vacuum gauge as claimed in claim 1, wherein said calculation unit calculates said real total pressure value and said concentration of the respective gas components to obtain a partial pressure value of the respective gas components.

3. A vacuum gauge as claimed in claim 1, wherein said mass spectrometer is a quadrupole mass spectrometer.

4. A vacuum gauge as claimed in claim 1, wherein said total pressure gauge is a Bayard-Alpart type ionization gauge.

5. A vacuum gauge as claimed in claim 1 further comprising a printer coupled to the calculation unit for printing out at least the real total pressure value of the measured gas components.

6. A vacuum gauge as claimed in claim 1, further comprising a television monitor coupled to the calculation unit for displaying at least the real total pressure value of the measured gas components.

7. A vacuum gauge as claimed in claim 1, wherein said calculation unit includes a memory for temporarily storing at least the ion current value and the apparent total pressure value, an arithmetic logic operation unit for executing the predetermined equation, and a central processing unit for processing the entire system of the vacuum gauge.

8. A vacuum gauge as claimed in claim 3, wherein said quadrupole mass spectrometer further comprises of an encoder for encoding the ion current value.

9. A vacuum gauge as claimed in claim 4, wherein said Bayard-Alpart type ionization gauge further comprises of an encoder for encoding the apparent total pressure value.

* * * * *

UNITED STATES PATENT AND TRADEMARK OFFICE
CERTIFICATE OF CORRECTION

PATENT NO. : 4,652,752
DATED : March 24, 1987
INVENTOR(S) : Yoichi Ino, et al.

It is certified that error appears in the above-identified patent and that said Letters Patent is hereby corrected as shown below:

Column 2, line 40, change "Where" to --where--.

Column 4, line 36, change "$H_3(N_2 + CO$ gas, $M/Z = 28) = 1\text{-}10^{-7}$ A" to --$H_3(N_2 + CO$ gas, $M/Z = 28) = 1 \times 10^{-7}$ A--.

Signed and Sealed this

Ninth Day of May, 1989

Attest:

DONALD J. QUIGG

*Attesting Officer*  *Commissioner of Patents and Trademarks*